United States Patent [19]
Hutchinson et al.

[11] Patent Number: 5,922,072
[45] Date of Patent: Jul. 13, 1999

[54] METHOD AND APPARATUS FOR CREATING ALTERNATE BOOT ENVIRONMENTS IN A COMPUTER

[75] Inventors: Wayne Leslie Hutchinson, Columbia, S.C.; Gary Lee Boggs, Poway, Calif.; David Neal Brinkman, West Columbia; Jeffrey Kittridge Janvrin, Columbia, both of S.C.

[73] Assignee: NCR Corporation, Dayton, Ohio

[21] Appl. No.: 08/778,522

[22] Filed: Jan. 3, 1997

[51] Int. Cl.⁶ .................................................. G06F 9/445
[52] U.S. Cl. .................................. 713/2; 395/712
[58] Field of Search ................... 395/652, 700, 395/392, 712, 600; 713/2

[56] References Cited

U.S. PATENT DOCUMENTS

| | | |
|---|---|---|
| 4,799,145 | 1/1989 | Goss et al. . |
| 5,053,797 | 10/1991 | Samuels et al. . |
| 5,155,847 | 10/1992 | Kirouac et al. ......................... 395/600 |
| 5,210,854 | 5/1993 | Beaverton et al. . |
| 5,247,683 | 9/1993 | Holmes et al. . |
| 5,257,377 | 10/1993 | Sathi et al. .............................. 395/700 |
| 5,274,816 | 12/1993 | Oka ......................................... 395/700 |
| 5,280,627 | 1/1994 | Flaherty et al. ........................ 395/700 |
| 5,325,532 | 6/1994 | Crosswy et al. ........................ 395/700 |
| 5,355,489 | 10/1994 | Bealkowski et al. ................... 395/700 |
| 5,355,498 | 10/1994 | Provino et al. ......................... 395/700 |
| 5,359,730 | 10/1994 | Marron . |
| 5,404,508 | 4/1995 | Konrad et al. .......................... 395/600 |
| 5,410,703 | 4/1995 | Nilsson et al. . |
| 5,421,017 | 5/1995 | Scholz et al. . |
| 5,469,573 | 11/1995 | McGill et al. .......................... 395/700 |
| 5,485,606 | 1/1996 | Midgdey et al. ....................... 395/600 |
| 5,579,522 | 11/1996 | Christeson et al. .................... 395/652 |
| 5,664,194 | 9/1997 | Paulsen .................................. 395/712 |
| 5,675,795 | 10/1997 | Rawson, III et al. .................. 395/652 |
| 5,701,477 | 12/1997 | Chejlava, Jr. .......................... 395/652 |
| 5,715,456 | 2/1998 | Bennet et al. .......................... 395/652 |
| 5,724,536 | 3/1998 | Abramson et al. .................... 395/392 |
| 5,764,992 | 6/1998 | Kullick et al. ......................... 395/712 |

*Primary Examiner*—Thomas M. Heckler
*Attorney, Agent, or Firm*—Gates & Cooper

[57] ABSTRACT

The present invention discloses a method, apparatus, and article of manufacture for version migration and fallback of software components in a computer system. The invention creates alternate boot environments that preserve the state of all original software components on a system before performing a software upgrade. The invention virtually eliminates the risks of migrating to upgraded system because users can quickly fall back to a previous operating environment, without extended downtime during and after upgrades.

18 Claims, 4 Drawing Sheets

5,922,072

METHOD AND APPARATUS FOR CREATING ALTERNATE BOOT ENVIRONMENTS IN A COMPUTER

BACKGROUND OF THE INVENTION

1. Field of Invention

The present invention generally relates to a method, apparatus, and article of manufacture for creating version migration and fallback for computer software. More specifically, this invention relates to a method for creating alternate boot environments that preserve the state of all original software components on a computer system before users perform a software upgrade.

2. Description of Related Art

Software products are perpetually upgraded with performance enhancements, new features, and problem corrections. These newer versions are released to computer users, but the user faces a risk of system failure when applying the software upgrade. Due to the inherent dependencies of computer hardware and software components, introducing a different version of a component into the system raises the possibility that a failure will occur. Such failures may range from a minor inconvenience to a catastrophic system failure. As a result, computer users risk extended downtime during and after upgrades, with no assurance of a complete fallback strategy.

To create a fall-back strategy, users have long performed system backups, where all the files of a computer are copied to removable media such as tape. However, system recovery using such a scheme is very time consuming. Further, performing a recovery overwrites the previous system contents.

Thus, there is a need for an invention that eliminates the risks of migrating to an upgraded system and allows users to quickly fall back to a previous operating environment.

SUMMARY OF THE INVENTION

To overcome the limitations in the prior art described above, the present invention discloses a method and apparatus for version migration and fallback. More specifically, the present invention discloses a method for creating alternate boot environments in a computer system, comprising the following steps. Copying at least one software component from a first disk location to an alternate boot environment and updating this software component. Activating the updated software component at the alternate boot environment. Terminating the activated updated software component upon failure. Activating the software component at the first disk location after the terminating step.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention discloses a method for version migration and fallback of computer software that creates one or more alternative boot environments (ABE) on a computer system. More specifically, this invention allows a computer user to preserve the state of all original software components on a system before performing a software upgrade by copying the software to an alternative boot environment while maintaining an original copy of the software.

Figure 1:
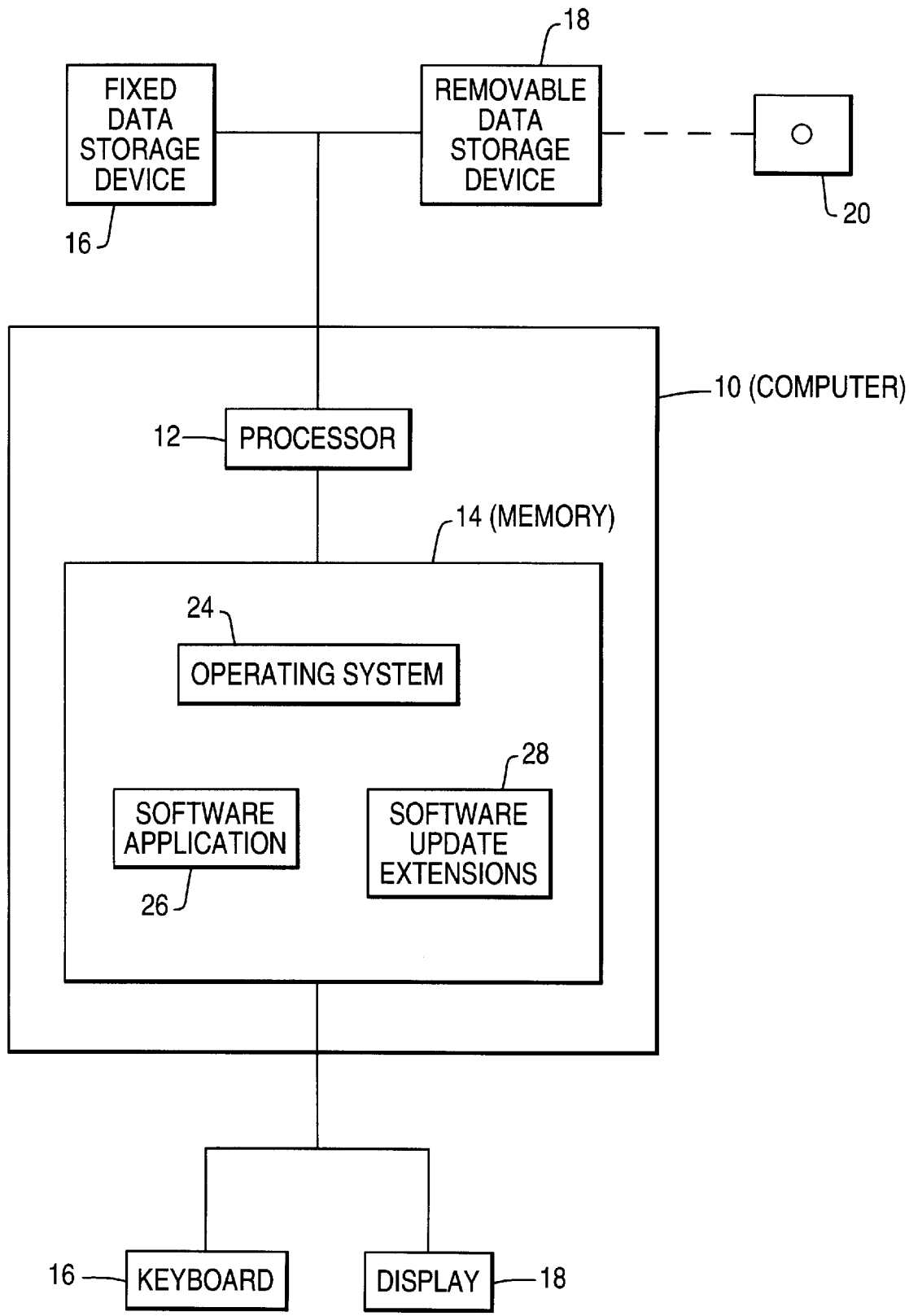
FIG. 1 is a block diagram that illustrates an exemplary hardware environment of the present invention.

FIG. 1 is a block diagram that illustrates an exemplary hardware environment of the present invention. The present invention is typically implemented in a computer 10 that is comprised of a CPU 12, random access memory (RAM) 14, and other components. It is envisioned that attached to the computer 10 may be fixed data storage devices 16 (such as hard disk drives) and/or removable data storage devices 18 (such as CD-ROM drives, floppy disk drives, tape drives, etc.) and their associated media 20. Also included in the preferred embodiment may be other input and output devices such as, for example, network interfaces, monitors, printers, keyboards, etc.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The computer 10 operates under the control of an operating system 24, such as the UNIX™, Windows™, Macintosh™, OS/2™, or other operating systems. The computer 10 executes one or more software applications 26 operating under the control of the operating system 24. The computer also executes one or more software update extensions 28 under the control of the operating system 24.

Generally, the operating system 24, the software application 26, and the software update extensions 28 are all tangibly embodied in a computer-readable medium, e.g., one or more of the fixed and/or removable data storage devices 16 and 18. The operating system 24, the software application 26, and the software update extensions 28 may be loaded from the data storage devices 14 and 16 into the random access memory 14 of the computer 10 for execution by the CPU 12. The operating system 24, the software application 26, and the software update extensions 28 all comprise instructions which, when read and executed by the CPU 12 of the computer 10, causes the computer 10 to perform the steps necessary to perform the method of the present invention.

The software update extension 28 is a software package of scripts, programs, and methodologies which provides a standardized way for software developers to release new versions of software components, e.g., the operating system 24 and/or software application 26. The primary advantage of the software update extension 28 is that it may be used to install or update the software components in a manner that increases availability of the computer 10. The software update extensions 28 may also include a fallback facility which maintain multiple versions of previously installed software components and allow a user to fallback to a previous version of the same software components.

In the present invention, the original software, e.g., the operating systems 24 and/or the software application, are copied from a first location on a data storage device 16 or 18 to a second location on the same or another data storage device 16 or 18. The copying step identifies all associated files of the original software components and copies these files to the ABE. Thereafter, the first location comprises an Original Boot Environment (OBE) and the second location comprises an Alternate Boot Environment (ABE). The software update extensions 28 are then applied to the ABE for version migration, leaving the OBE untouched. Therefore, in the event that the software components in the ABE somehow fail or do not work correctly, the OBE is preserved as a fallback.

Multiple instances of the ABE may be created for each subsequent version of the software update extensions 28. Further, the source for each ABE (be it the OBE or a previous ABE) may be designated as desired by the user. Thereafter, fallback may be selected from the currently active ABE to an earlier ABE or the OBE, as required.

Alternatively, upon completion of the ABE, a newer version of the software update extensions 28 may be applied to the OBE for version migration, with the ABE providing the fallback location. In this manner, the OBE subsequently becomes the new ABE and the ABE subsequently becomes the new OBE. Of course, this assumes that it is not necessary or desired to incorporate a new software update extension 28 being applied to the OBE with the intervening software update extension 28 previously applied to the ABE.

The present invention thus provides the capability of using the software update extensions 28 to either update currently active software components in a currently active ABE, or to update currently inactive software components in an inactive OBE or previous ABE. This invention allows users to select which ABE or OBE should be upgraded. This designated ABE may be active or inactive. The invention creates these updating options by limiting the scope of files and directories which can be accessed and/or modified by the software upgrade extension 28 so that only the software components in the designated ABE are affected by an upgrade.

On computers 10 with limited data storage resources (e.g., only one disk drive 16), the invention provides the ability to maintain multiple ABEs on a single "boot" disk. That is, a single disk drive 16 may contain two or more ABEs, each containing entirely different versions of the software components.

This invention further performs all the necessary modifications to the ABEs such that the computer 10 may boot from a designated ABE. Preferably, the invention allows a user to designate an active ABE and then updates the disk drive 16 so that the designated ABE will be used upon the next reboot of the computer 10.

In addition to providing a fallback from version migration, the present invention is a powerful tool for customizing the version migration. When creating an ABE, the user has the ability to customize the software components in the ABE through configuration options. The user can modify the file system layout to combine several file systems into one, or a single file system can be separated into multiple file systems on the ABE. The user can migrate to different size file systems and/or different file system types. For example, a current boot disk drive 16 may have all system files on a root file system. The user can modify this file system layout by separating the root file system into multiple file systems.

Creating Alternate Boot Environments

Figure 2:
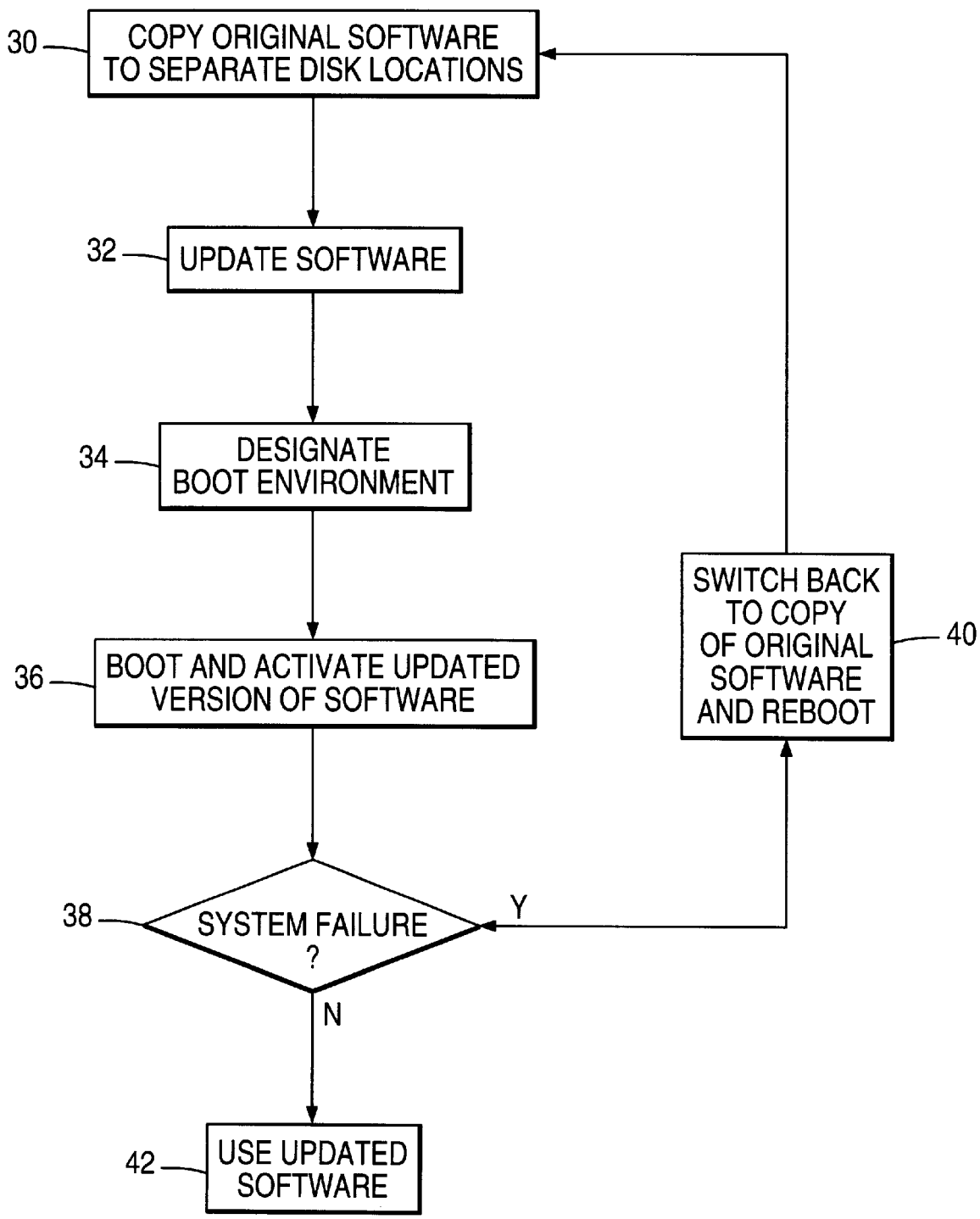
FIG. 2 is a flowchart showing the steps performed by the computer when a user creates alternate boot environments.

FIG. 2 is a flowchart illustrating the operation of computer 10 in accordance with the present invention.

Block 30 represents the computer 10 copying the original software components, e.g., the operating system 24 and/or the software application 26, from a first location on a first data storage device to a second location on the same or another data storage device. In most situations, the first location comprises the OBE and the second location comprises the ABE, although the first location may comprise an earlier ABE and the second location may comprise a later or subsequent ABE.

Block 32 represents the computer 10 updating the software components copied to the second location under the control of the software update extensions 28. After the update, two or more ABEs exist, wherein each contains entirely different versions of the software components.

Block 34 represents the computer 10 designating a desired ABE as the active ABE. Generally, the active ABE is the ABE at the second location, although this is under the control of the user.

Block 36 represents the computer 10 booting from the designated ABE and activating the software components on the designated ABE.

Block 38 is a decision block that represents the computer 10 determining whether a failure of some sort occurred in the booting of the designated ABE. If so, control transfers to Block 40, which represents the computer 10 switching back to the previous ABE or OBE and re-booting using the software components in the previous ABE or OBE. The invention executes Blocks 30 through 40 until a successful boot is achieved.

Block 42 represents the computer 10 executing the software from the designated ABE or OBE.

Original and Alternate Boot Environments

FIGS. 3, 4, 5, and 6 are block diagrams illustrating the structure of the original and alternate boot environments on one or more data storage devices according to the present invention.

Figure 3:
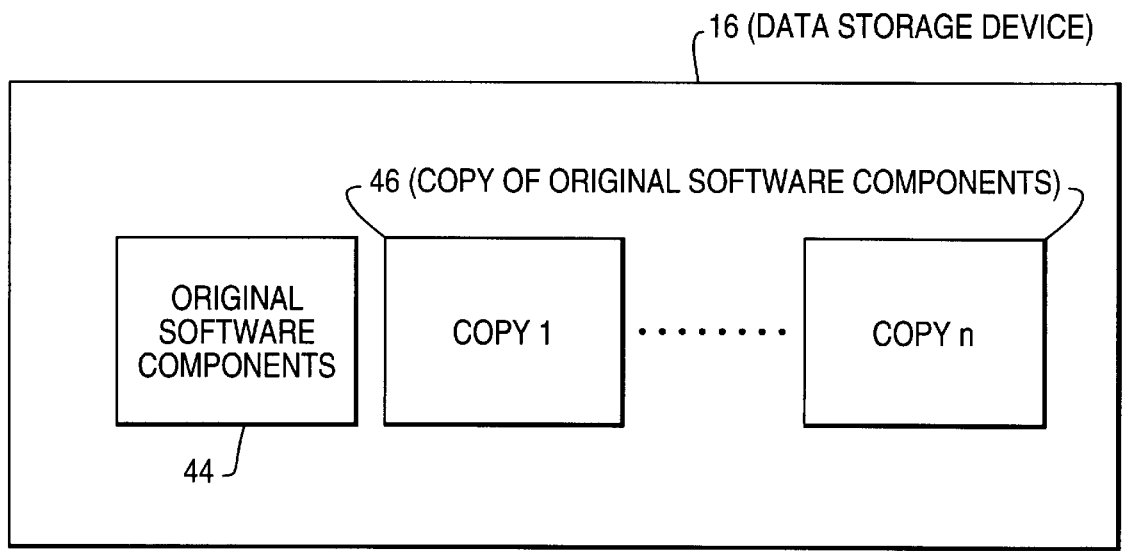
FIG. 3 is a representation of the computer responding to a user's command to copy original software components.

In FIG. 3, the original boot environment (OBE) is designated as 44 and includes the original software components. One or more alternate boot environments (ABEs) are designated as 46 and include a copy of the original software components. These ABEs are created by the computer 10 responding to a user command to copy original software components 44 from a first location to a second location.

Figure 4:
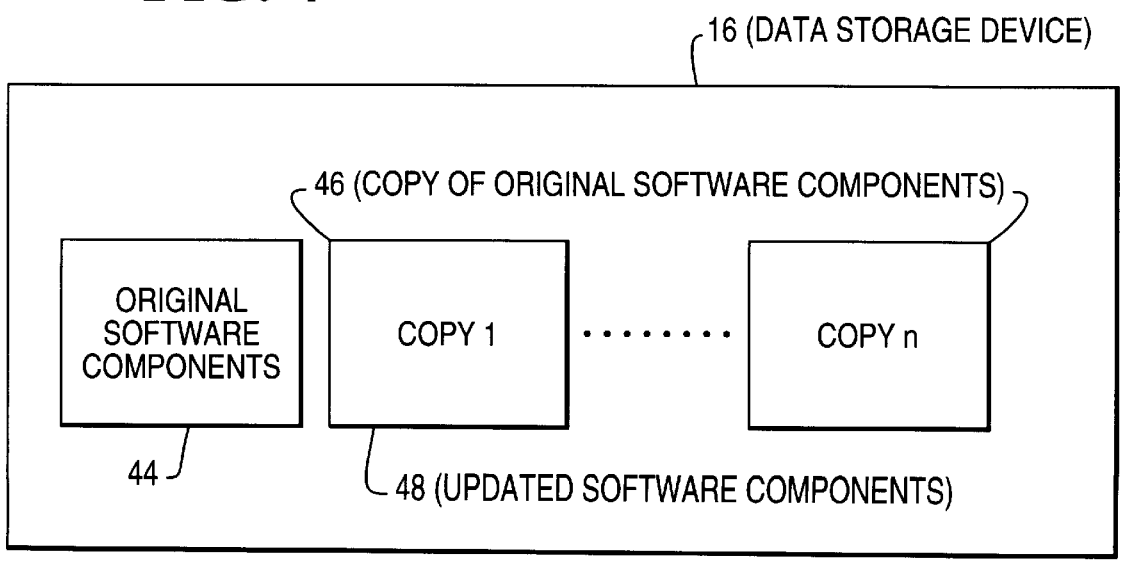
FIG. 4 is a representation of updated software components.

In FIG. 4, one of the ABEs designated by 48 is updated using the software update extensions 28. The updated ABE 48 may be designated as active or inactive. The invention creates this updating option by limiting the scope of files and directories which can be accessed and/or modified by the software upgrade extensions 28 so that only the designated ABE 48 is affected thereby.

Figure 5:
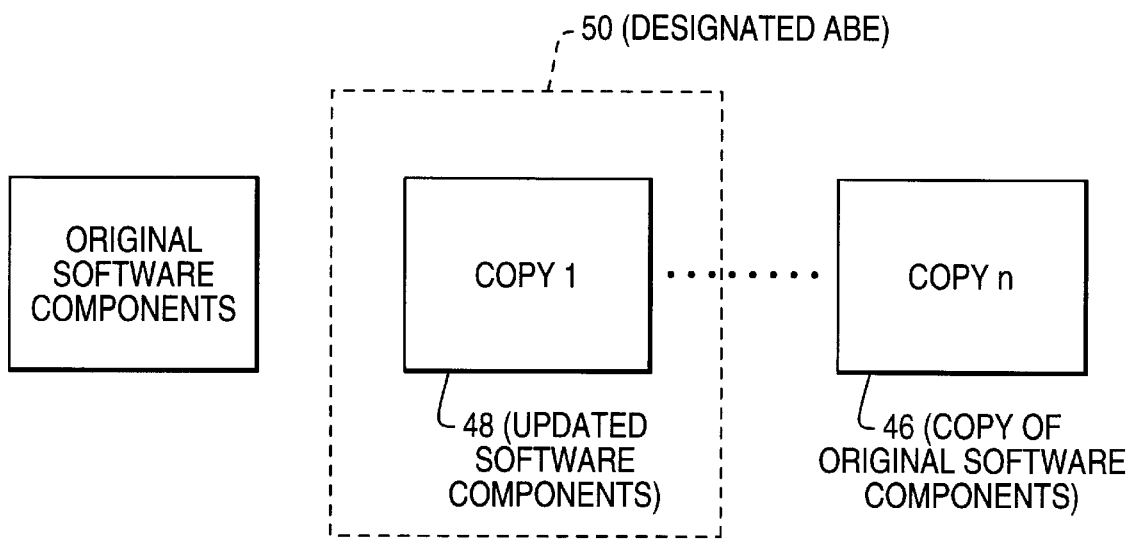
FIG. 5 illustrates a designated alternate boot environment.

In FIG. 5, the ABE 48 updated by the software update extensions 28 is designated as the active ABE 50. On computers 10 with limited data storage resources (e.g., only one disk drive 16), the invention supports the ability to maintain multiple ABEs on a single "boot" disk. That is, a single disk drive 16 may contain two or more ABEs, each containing entirely different versions of the software components. This invention further performs all the necessary modifications such that the computer 10 may boot from the designated ABE. As indicated above, the invention allows a user to designate the active ABE, and then updates the operating system 24 and/or the data storage device so that the selected ABE 50 will become active upon the next reboot of the computer 10.

Figure 6:
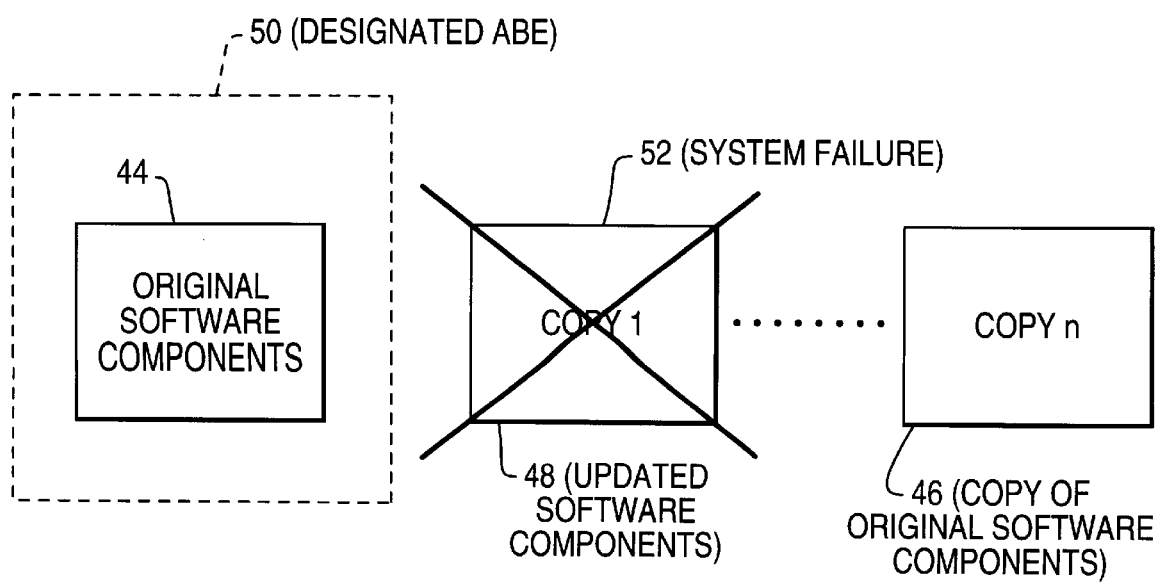
FIG. 6 is a representation of a system failure.

In FIG. 6, the "X" through ABE 48 indicates a failure occurred as designated by 52. In response to the failure 52, a switch back to the OBE 44 as the active OBE is made (either manually or automatically) as designated by 50. The computer 10 is then re-booted from the newly designated active OBE 44.

Conclusion

This concludes the description of the preferred embodiment of the invention. In summary, the method involves creating alternate boot environments that preserve the state of all original software components on a system before performing a software upgrade.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating alternate boot environments in a computer, comprising the steps of:
   (a) copying at least one software component from a first location on a first data storage device coupled to the computer to a second location on a second data storage device coupled to the computer;
   (b) updating the software components in the second location on the second data storage device;
   (c) booting the computer from the alternate boot environment by activating the updated software components at the second location on the second data storage device;
   (d) terminating the booting step when the activated updated software components fail to operate correctly; and
   (e) activating the software components at the first location on the first data storage device after the terminating step.

2. The method of claim 1 above, wherein the first location comprises an original boot environment and the second location comprises an alternate boot environment.

3. The method of claim 1 above, wherein the first location comprises a first alternate boot environment and the second location comprises a second alternate boot environment.

4. The method of claim 1 above, wherein the first data storage device is the second data storage device.

5. The method of claim 1 above, wherein the first data storage device is not the second data storage device.

6. The method of claim 1 above, further comprising the steps of identifying all files associated with the software components at the first location and copying the identified files from the first location to the second location.

7. An apparatus for creating alternate boot environments in a computer, comprising:
   (a) means, performed by the computer, for copying at least one software component from a first location on a first data storage device coupled to the computer to a second location on a second data storage device coupled to the computer;
   (b) means, performed by the computer, for updating the software components in the second location on the second data storage device;
   (c) means, performed by the computer, for booting the computer from the alternate boot environment by activating the updated software components at the second location on the second data storage device;
   (d) means, performed by the computer, for terminating the booting step when the activated updated software components fail to operate correctly; and
   (e) means, performed by the computer, for activating the software components at the first location on the first data storage device after the terminating step.

8. The apparatus of claim 7 above, wherein the first location comprises an original boot environment and the second location comprises an alternate boot environment.

9. The apparatus of claim 7 above, wherein the first location comprises a first alternate boot environment and the second location comprises a second alternate boot environment.

10. The apparatus of claim 7 above, wherein the first data storage device is the second data storage device.

11. The apparatus of claim 7 above, wherein the first data storage device is not the second data storage device.

12. The apparatus of claim 7 above, further comprising means for identifying all files associated with the software components at the first location and means for copying the identified files from the first location to the second location.

13. An article of manufacture for creating alternate boot environments, comprising the steps of:
   (a) copying at least one software component from a first location on a first data storage device coupled to the computer to a second location on a second data storage device coupled to the computer; (b) updating the software components in the second location on the second data storage device;
   (c) booting the computer from the alternate boot environment by activating the updated software components at the second location on the second data storage device;
   (d) terminating the booting step when the activated updated software components fail to operate correctly, and
   (e) activating the software components at the first location on the first data storage device after the terminating step.

14. The method of claim 13 above, wherein the first location comprises an original boot environment and the second location comprises an alternate boot environment.

15. The method of claim 13 above, wherein the first location comprises a first alternate boot environment and the second location comprises a second alternate boot environment.

16. The method of claim 13 above, wherein the first data storage device is the second data storage device.

17. The method of claim 13 above, wherein the first data storage device is not the second data storage device.

18. The method of claim 13 above, further comprising the steps of identifying all files associated with the software components at the first location and copying the identified files from the first location to the second location.

* * * * *